United States Patent [19]

Manz

[11] Patent Number: 5,063,749
[45] Date of Patent: Nov. 12, 1991

[54] REFRIGERANT HANDLING SYSTEM WITH AIR PURGE AND MULTIPLE REFRIGERANT CAPABILITIES

[75] Inventor: Kenneth W. Manz, Paulding, Ohio

[73] Assignee: Kent-Moore Corporation, Warren, Mich.

[21] Appl. No.: 576,952

[22] Filed: Sep. 4, 1990

Related U.S. Application Data

[63] Continuation-in-part of Ser. No. 463,449, Jan. 11, 1990, Pat. No. 5,005,369, which is a continuation-in-part of Ser. No. 405,236, Sep. 11, 1989, abandoned.

[51] Int. Cl.$^5$ .................. F25B 45/00; F25B 43/04
[52] U.S. Cl. ................................ 62/149; 62/129; 62/195; 62/475
[58] Field of Search ............ 62/77, 85, 125, 126, 62/127, 129, 149, 195, 292, 475

[56] References Cited

U.S. PATENT DOCUMENTS

| | | | |
|---|---|---|---|
| 2,475,218 | 7/1949 | Campbell | 62/85 |
| 4,417,451 | 11/1983 | Spauschus | 62/85 X |

Primary Examiner—Harry B. Tanner
Attorney, Agent, or Firm—Barnes, Kisselle, Raisch, Choate, Whittemore & Hulbert

[57] ABSTRACT

A refrigerant handling system in accordance with the present invention includes a closed liquid refrigerant storage container and a pump for feeding refrigerant in liquid phase to the container so that any air carried by the circulating refrigerant is captured in the container over the refrigerant. A differential pressure gauge has a first input that receives a fluid pressure signal which varies as a function of saturation pressure of refrigerant in liquid phase fed to the container, and a second input that receives an associated fluid pressure signal as a function of air pressure within the closed container volume. An indicator dial on the gauge displays pressure differential between the refrigerant saturation pressure and the container vapor pressure at the first and second gauge inputs for observation by an operator. A valve is coupled to the container for venting air from the container when such pressure differential exceeds a preselected threshold.

5 Claims, 2 Drawing Sheets

REFRIGERANT HANDLING SYSTEM WITH AIR PURGE AND MULTIPLE REFRIGERANT CAPABILITIES

This application is a continuation-in-part of application Ser. No. 07/463,449 filed Jan. 11, 1990, now U.S. Pat. No. 5,005,369 which is a continuation-in-part of application Ser. No. 07/405,236 filed Sept. 11, 1989 abandoned.

The present invention is directed to refrigerant handling systems, and more particularly to a device for purging air from within a liquid refrigerant storage container.

BACKGROUND AND OBJECTS OF THE INVENTION

U.S. Pat. No. 4,768,347, assigned to the assignee hereof, discloses a refrigerant recovery system that includes a compressor having an inlet coupled through an evaporator and through a solenoid valve to the refrigeration equipment from which refrigerant is to be withdrawn, and an outlet coupled through a condenser to a refrigerant storage container or tank. The evaporator and condenser are contained within a closed cylindrical canister for heat exchange and oil separation, the canister having an oil drain in the bottom. The refrigerant storage container is carried by a scale having a limit switch coupled to control electronics to prevent or terminate further refrigerant recovery when the container is full. The scale comprises a platform pivotally mounted by a hinge pin to a wheeled cart, which also carries the evaporator/condenser unit, compressor, control electronics and associated valves and hoses.

U.S. Pat. No. 4,805,416, also assigned to the assignee hereof, discloses systems for recovering, purifying and recharging refrigerant in which, during a purification cycle, refrigerant is circulated from the refrigerant storage container in a closed path through a circulation valve and a filter for removing water and other contaminants, and then returned to the container. U.S. application Ser. No. 263,887, filed Oct. 28, 1988 and also assigned to the assignee hereof, discloses a refrigerant recovery system that includes a refrigerant storage container, refrigeration circuitry for withdrawing refrigerant from equipment under service and feeding such refrigerant to the container for storage, and a scale supporting the container for sensing impending overfill of the container. The scale includes a beam horizontally rigidly cantilevered from a base. A switch is positioned adjacent to resilient deflection of the beam to indicate impending overfill of the container and prevent or terminate operation or the refrigerant recovery system.

A problem with refrigeration service devices of the subject character lies in potential entrapment of air in the air conditioning system being serviced. All refrigerants, including R12 (dichlorodifluoromethane), have characteristics saturation pressures that vary as associated functions of temperature as long as refrigerant is present in both liquid and vapor phases, such as in the refillable storage container of a refrigerant recovery, purification and/or recharging station. If air is present in the system or container, a differential pressure above the saturation pressure is created that is proportional to the quantity of air. However, absorption of air is undesirable in an air conditioning system in that it displaces cooling capacity, causes higher operating temperatures and pressures, and reduces operating life of compressor components. Automotive vehicle manufacturers have set a limit on the amount of air permissible in a refillable storage container after recovery and recycling (such as through a filter/dryer) and prior to recharging into a vehicle. Commercial air conditioning and refrigeration system manufacturers are expected to establish similar limits.

Another problem arises due to development and commercial implementation of differing types of refrigerants, such as R12, R22 and R502. On the one hand, it is important that refrigerant of a given type not be inadvertently mixed with or contaminated by refrigerant of a differing type, which would deleteriously affect operating characteristics of the refrigerant. On the other hand, it is undesirable that refrigerant handling system operators and service personnel be required to have redundant refrigerant handling systems for differing types of refrigerants simply to reduce the likelihood of intermixing and contamination.

It is therefore a general object of the present invention to provide a refrigerant handling system that includes facility for purging trapped air from the system. A more specific object of the invention is to provide a system for circulating liquid refrigerant to a storage container that includes facility for purging air from within the container when the differential air pressure within the container exceeds saturation pressure of refrigerant within the system by more than a preselected threshold. Yet another and more specific object of the invention is to provide a liquid refrigerant purification system that includes a refrigerant storage container, a pump coupled to the container for circulating liquid refrigerant from the container through a filter/dryer and then returning the refrigerant to the container, and a purging valve for venting air from the container when the air/saturation pressure differential within the container exceeds a prespecified threshold.

A further object of the present invention is to provide a refrigerant handling system, including specifically but not necessarily limited to a refrigerant purification system of the character described above, that includes facility for handling multiple differing types of refrigerants having differing saturation pressure/temperature characteristics without requiring replacement or recalibration of the mechanism for indicating saturation pressure of refrigerant within the system.

SUMMARY OF THE INVENTION

A refrigerant handling system in accordance with the present invention includes a closed liquid refrigerant storage container and a pump (which may be a compressor) for feeding refrigerant in liquid phase to the container so that any air carried by the circulating refrigerant is captured in the container over the refrigerant. A differential pressure gauge has a first input that receives a fluid pressure signal which varies as a function of saturation pressure of refrigerant in liquid phase fed to the container, and a second input that receives an associated fluid pressure signal as a function of refrigerant/air (vapor) pressure within the closed container volume. An indicator dial on the gauge displays pressure differential, between the refrigerant saturation pressure and the container vapor pressure at the first and second gauge inputs, for observation by an operator. A valve is coupled to the container for venting air from the container when such pressure differential exceeds a preselected threshold.

In a preferred embodiment of the invention, a bulb containing refrigerant of a first predetermined type is positioned for heat transfer contact with liquid refrigerant fed to the container so as to develop a fluid pressure signal, which is fed to the first input of the differential pressure gauge, as a function of liquid refrigerant saturation pressure. The differential pressure gauge is a double-needle gauge that includes first and second indicator needles mounted for independent rotation about a common axis, and first and second bourdon tubes coupled to the respective needles and responsive to the first and second gauge inputs for positioning the needles about the gauge axis as a function of refrigerant saturation pressure and container vapor pressure respectively. The faceplate of the gauge positioned adjacent to the needles bears scales or other suitable indicia oriented circumferentially of the gauge axis and coordinated with angular position of the respective needles for indicating refrigerant saturation and container air pressures.

For handling refrigerant of differing predetermined types while employing a single bulb containing refrigerant of a first predetermined type to determine liquid refrigerant saturation pressure, the gauge faceplate includes a plurality of scale indicia oriented circumferentially of the axis and coordinated with saturation pressure/temperature characteristics of the first predetermined type of refrigerant for indicating saturation pressure of liquid refrigerant circulating in the system as a function of fluid pressure over the refrigerant in the bulb and type of refrigerant circulating in the handling system. In this way, a single refrigeration handling system may be employed for multiple differing types of refrigerant without requiring recalibration of the differential pressure gauge or saturation pressure conversion calculations by the operator for differing refrigerant types.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENT

Figure 1:
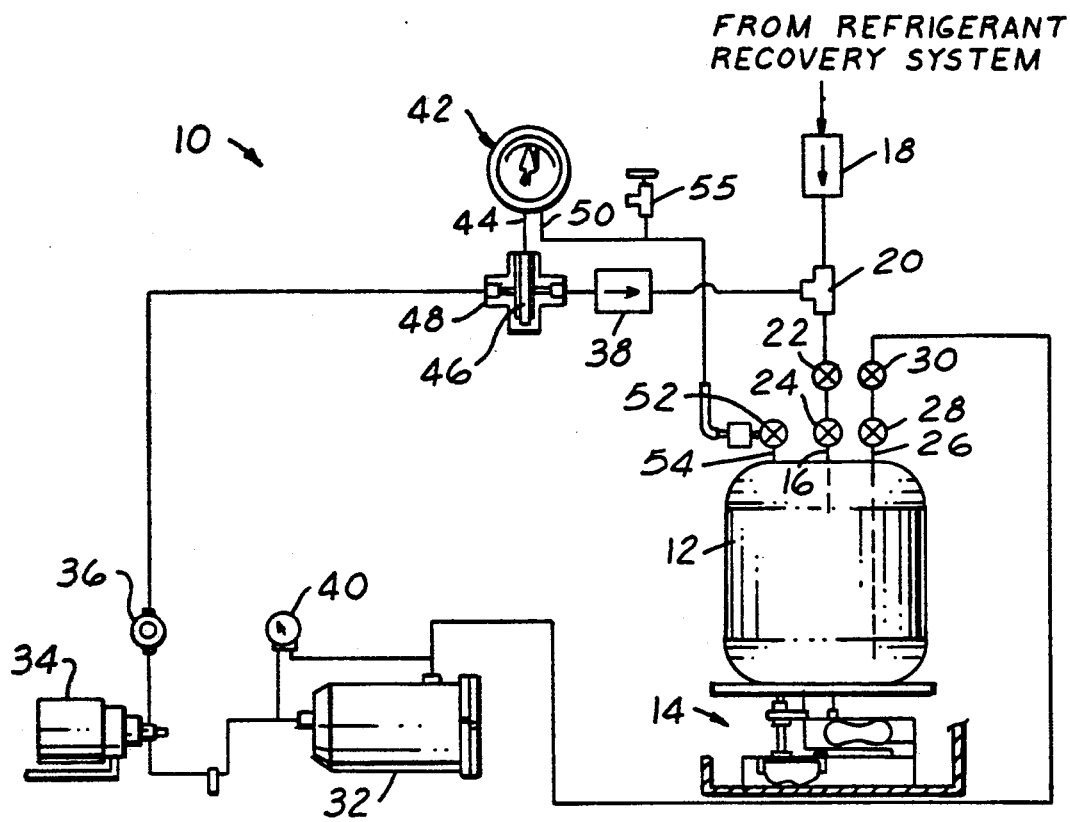
FIG. 1 is a schematic diagram of a refrigerant purification system in accordance with one exemplary implementation of the invention.

FIG. 1 illustrates a refrigeration purification system 10 that includes a liquid refrigerant storage container 12 carried by a scale 14. Container 12 has a vapor port 16 that receives refrigerant from an external source, such as a refrigerant recovery system of the type disclosed in above-noted U.S. Pat. No. 4,768,347, through a check valve 18, a tee coupling 20 and a pair of manual valves 22,24. Scale 14 indicates weight of refrigerant within container 12 to suitable external control electronics (not shown). A liquid refrigerant port 26 of container 12 is connected through a pair of manual valves 28,30 to the inlet of a replaceable-core filter/dryer unit 32 of any suitable conventional type. The outlet of filter/dryer 32 is connected to tee 20 through a liquid refrigerant pump 34, a moisture indicator 36 and a check valve 38. A differential pressure gauge 40 is connected across filter/dryer unit 32 to indicate pressure drop across unit 32 above a preselected threshold, which may be marked on the pressure indicator, and thereby advise an operator to replace the filter/dryer core of unit 32.

A differential pressure gauge 42 has a first fluid input 44 coupled to a bulb 46 that contains refrigerant of a predetermined type, such as R12 refrigerant. Bulb 46 is positioned within a fitting 48 that is connected between moisture indicator 36 and check valve 38 so that liquid refrigerant returned by pump 34 to container 12 passes in external heat-transfer contact with the shell of bulb 46. In this way, heat is transferred between liquid refrigerant circulated by pump 34 and the refrigerant captured within bulb 46, so that a fluid pressure is developed over the refrigerant in bulb 46 that varies as a function of saturation pressure of the specific refrigerant type contained within the bulb at the temperature of the refrigerant fed to container 12. If the refrigerant circulated by pump 34 to and from container 12 is of the same type as that captured within bulb 46—e.g., R12 refrigerant—the fluid pressure developed within bulb 46 provides a direct indication of circulating refrigerant saturation pressure. On the other hand, if the refrigerant circulated by pump 34 is of a type different from that captured within bulb 46—e.g., circulating R22 refrigerant rather than the R12 refrigerant within bulb 46—then the actual saturation pressure of the circulating refrigerant bears a known relationship to saturation pressure of the refrigerant within bulb 46 when the temperatures of the two refrigerants are equal.

Gauge 42 has a second fluid input 50 connected through a manual valve 52 to the purge port 54 of container 12 so as to connect the second gauge input to the container headspace. Thus, gauge 42 receives first and second inputs as respective functions of saturation pressure of refrigerant circulated by pump 34, and air pressure within container 12. A manual valve 55 is connected between purge port 54 and gauge input 50 for selectively purging air from within canister 12.

Figure 2:
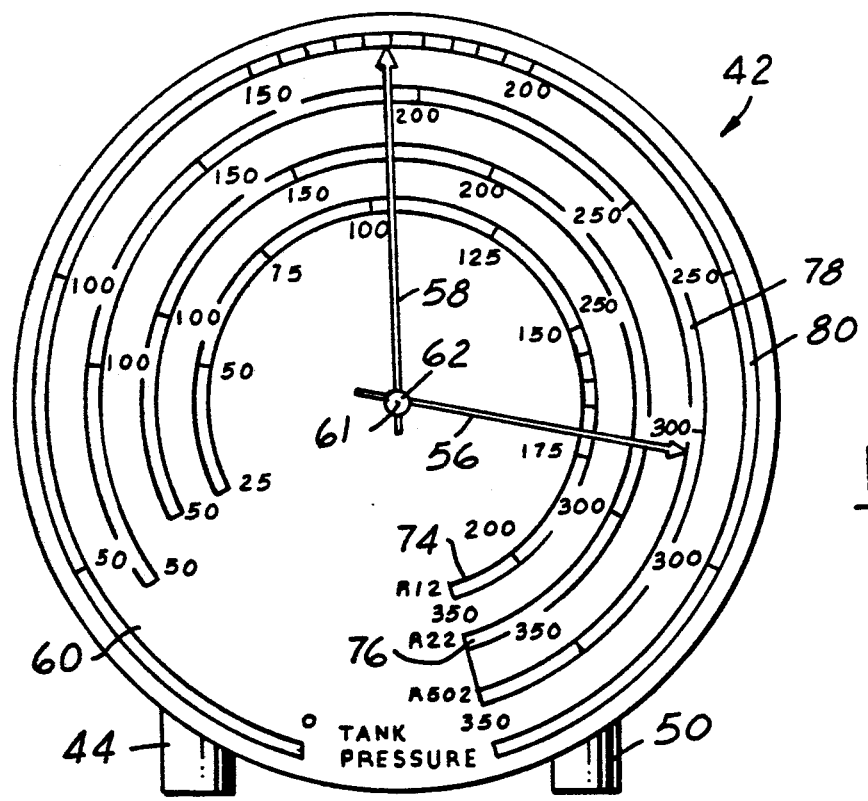
FIG. 2 is a front elevational view on an enlarged scale of the differential pressure gauge illustrated schematically in FIG. 1.
Figure 3:
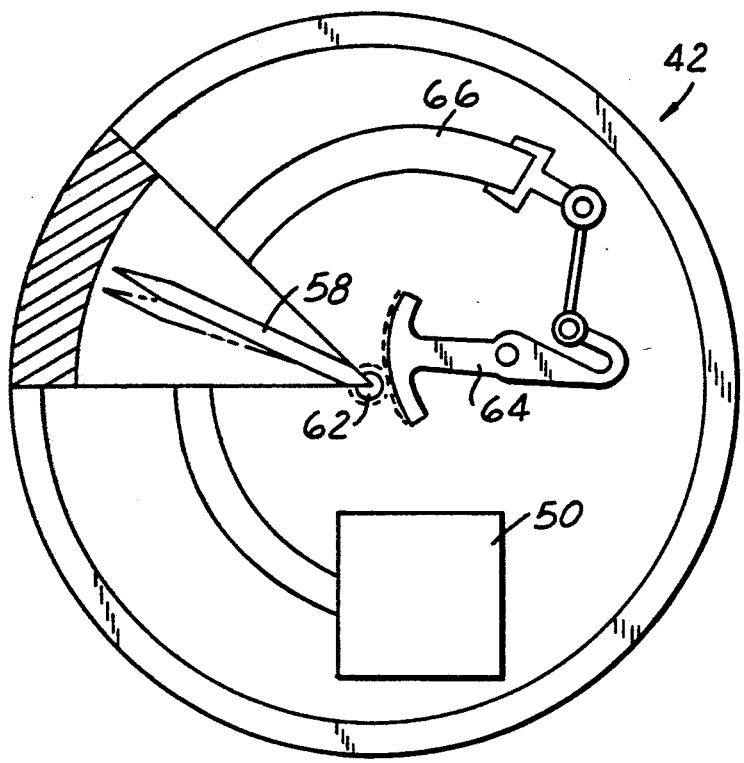
FIG. 3 is an elevational schematic diagram of the gauge of FIG. 2 with face place removed.
Figure 4:
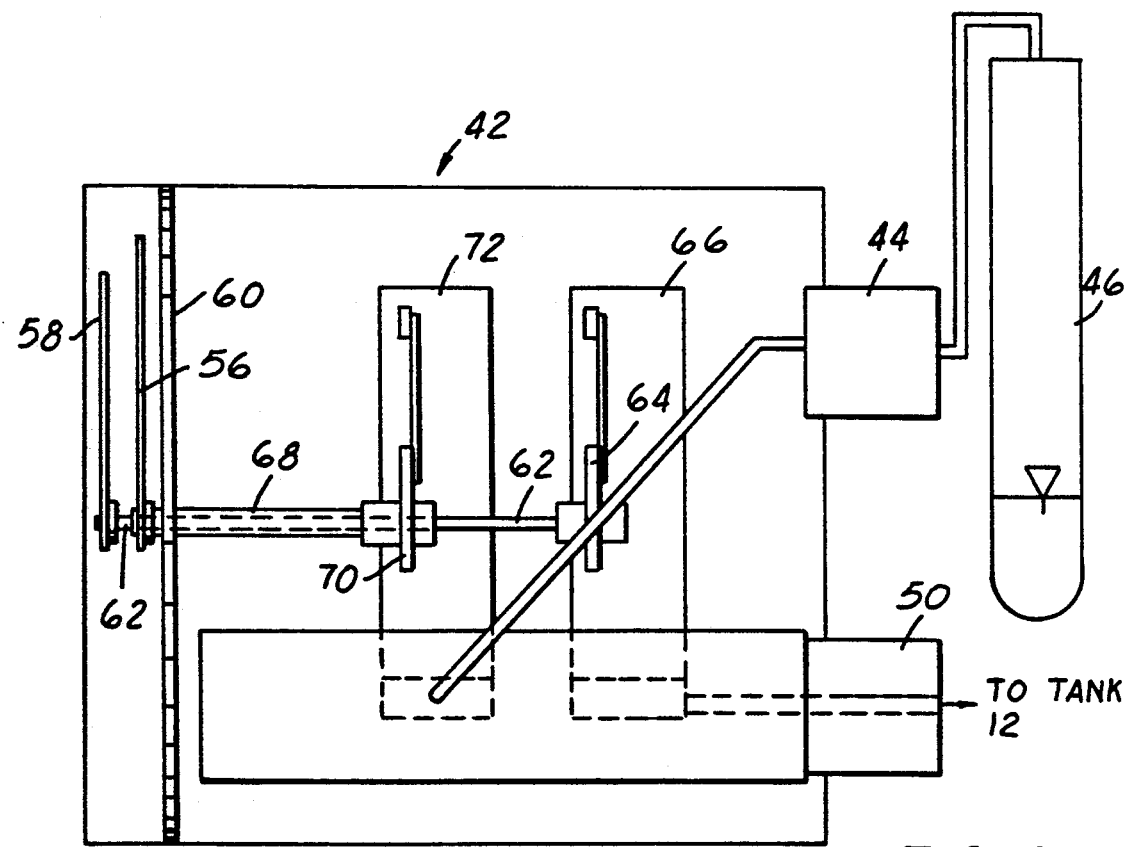
FIG. 4 is a schematic diagram laterally bisecting the gauge illustrated in FIGS. 2 and 3.

As shown in FIGS. 2–4, gauge 42 includes a pair of indicator needles 56,58 mounted for independent rotation adjacent to a faceplate 60 about a common axis 61. Needle 58 is connected by a shaft 62 to a gear arrangement 64 coupled to a bourdon tube 66. Bourdon tube 66 receives a fluid input from gauge input port 50. Likewise, needle 56 is coupled by a sleeve 68, which surrounds shaft 62, to a gear arrangement 70 and a bourdon tube 72 that receives fluid pressure from gauge port 44 and bulb 46. The bourdon tube and needle arrangements of gauge 42 are of conventional type in which the angular positions of the respective needles vary as functions of flexure of the associated bourdon tubes, which in turn vary as a function of fluid pressure fed to the bourdon tubes.

As shown in FIG. 2, faceplate 60 in the illustrated embodiment of the invention bears four radially spaced arcuate scales 74,76,78,80. The outer scale 80 has associated indicia printed on the surface of faceplate 60 for cooperating with needle 58 to indicate refrigerant/air (vapor) pressure within container 12 (FIG. 1). In the specific embodiment illustrated in FIG. 2, tank pressure scale 80 ranges from 0 to 350 psi. Inner scales 74,76,78 have associated indicia that cooperate with needle 56, which is of lesser radial dimension than needle 58, for indicating saturation pressure of liquid refrigerant circulated by pump 34 from and to container 12 for three differing predetermined types of refrigerant—e.g., R12 refrigerant for scale 74, R22 refrigerant for scale 76 and R502 refrigerant for scale 78. Thus, for the gauge 42 illustrated in FIG. 2, the saturation pressure range for R12 refrigerant is from about 25 to about 225 psi, for R22 refrigerant about 50 to 350 psi, and for R502 refrigerant about 50 to 375 psi.

Scales 74,76,78 are oriented and calibrated with respect to each other in association with the predetermined type of refrigerant contained within bulb 46 so as to indicate saturation pressure of the particular type of refrigerant circulated by the pump. For example, at the position of needle 56 illustrated in FIG. 2, a saturation pressure of about 170 psi is indicated for R12 refrigerant, a pressure of approximately 285 psi for R22 refrigerant and a pressure of approximately 305 psi for R502 refrigerant. Thus, depending upon the known type of refrigerant being circulated by pump 34, an operator may observe gauge 42 and determine refrigerant saturation pressure. In the same way, vapor pressure within container 12 is directly indicated by needle 58 and scale 80—i.e., approximately 175 psi in the illustration of FIG. 2. Thus, depending upon the maximum desired air/saturation pressure differential, the operator may open valve 55 and vent air from within container 12.

I claim:

1. In a refrigerant handling system that includes a first closed volume, and means for feeding refrigerant in liquid phase to said volume so as to capture air in said volume over said refrigerant, said refrigerant being characterized by a liquid/vapor saturation pressure that varies as a function of refrigerant type and temperature, means for purging air captured in said volume comprising:

first means coupled to said refrigerant feeding means externally of said closed volume for developing a first fluid pressure as a function of saturation pressure of refrigerant in liquid phase fed to said volume, second means coupled to said first closed volume for developing a second fluid pressure as a function of refrigerant/air vapor pressure in said volume, a differential pressure gauge having first and second inputs coupled to said first and second means, and means for indicating a pressure differential therebetween, and means coupled to said volume for venting air in said volume when said pressure differential exceeds a preselected threshold, said differential pressure gauge comprising a double-needle gauge including first and second indicator needles mounted for independent rotation about a common axis, first and second means respectively coupled to said first and second needles and responsive to said first and second inputs for positioning said needles about said axis as a function of said first and second pressures, and a faceplate positioned adjacent to said needles bearing indicia oriented circumferentially of said axis and coordinated with angular positions of said needles for indicating said first and second pressures.

2. The system set forth in claim 1 wherein said air-venting means comprises a manual valve.

3. The system set forth in claim 1 wherein said first means comprises a second closed volume containing refrigerant of first predetermined type and means coupled to said refrigerant-feeding means for passing refrigerant in liquid phase in heat-transfer contact with said second closed volume such that pressure of said refrigerant in said second closed volume varies as a direct function of saturation pressure of refrigerant in said feeding means.

4. In a refrigerant handling system that includes a first closed volume, and means for feeding refrigerator in liquid phase to said volume so as to capture air in said volume over said refrigerant, said refrigerant being characterized by a liquid/vapor saturation pressure that varies as a function of refrigerant type and temperature, means for purging air captured in said volume comprising:

first means coupled to said refrigerant feeding means externally of said closed volume for developing a first fluid pressure as a function of saturation pressure of refrigerant in liquid phase fed to said volume, said first means comprising a second closed volume containing refrigerant of first predetermined type and means coupled to said refrigerant-feeding means for passing refrigerant in liquid phase in heat-transfer contact with said second closed volume such that pressure of said refrigerant in said second closed volume varies as a direct function of saturation pressure of refrigerant in said feeding means, second means coupled to said first closed volume for developing a second fluid pressure as a function of refrigerant/air vapor pressure in said volume, a differential pressure gauge having first and second inputs coupled to said first and second means, and means for indicating a pressure differential therebetween, and means coupled to said volume for venting air in said volume when said pressure differential exceeds a preselected threshold, said differential pressure gauge comprising a double-needle gauge including first and second indicator needles mounted for independent rotation about a common axis, first and second means respectively coupled to said first and second needles and responsive to said first and second inputs for positioning said needles about said axis as a function of said first and second pressures, and a faceplate positioned adjacent to said needles bearing indicia oriented circumferentially of said axis and coordinated with angular positions of said needles for indicating said first and second pressures.

5. The system set forth in claim 4 for handling refrigerant of differing predetermined types wherein said faceplate includes a plurality of indicia oriented circumferentially of said axis and coordinated with saturation pressure/temperature characteristics of said refrigerant of said first type for indicating saturation pressure of refrigerant in said feeding means as a function of said first pressure and type of refrigerant in said feeding means.

* * * * *